United States Patent
Ryan et al.

(10) Patent No.: US 9,435,482 B2
(45) Date of Patent: Sep. 6, 2016

(54) DUCT ASSESSMENT AND LEAK SEALING METHOD FOR DUCTS TRANSPORTING GAS

(75) Inventors: Nicholas John Ryan, Aberdeenshire (GB); Andrew James Cochran, Aberdeenshire (GB); Matthew David Meredith, Aberdeen (GB)

(73) Assignee: SEAL-TITE, LLC, Madisonville, LA (US)

( * ) Notice: Subject to any disclaimer, the term of this patent is extended or adjusted under 35 U.S.C. 154(b) by 1377 days.

(21) Appl. No.: 12/864,165

(22) PCT Filed: Jan. 26, 2009

(86) PCT No.: PCT/GB2009/050072
§ 371 (c)(1),
(2), (4) Date: Oct. 26, 2010

(87) PCT Pub. No.: WO2009/093083
PCT Pub. Date: Jul. 30, 2009

(65) Prior Publication Data
US 2011/0187056 A1    Aug. 4, 2011

(30) Foreign Application Priority Data

Jan. 25, 2008 (GB) .................................. 0801461.5

(51) Int. Cl.
*F16L 55/00* (2006.01)
*F16L 55/48* (2006.01)
*F16L 101/30* (2006.01)

(52) U.S. Cl.
CPC ............ *F16L 55/48* (2013.01); *F16L 2101/30* (2013.01)

(58) Field of Classification Search
CPC .... F16L 2101/30; F16L 55/48; F16L 55/164
USPC ......... 138/98, 97, 104; 73/49.8, 40; 277/314
See application file for complete search history.

(56) References Cited

U.S. PATENT DOCUMENTS

| 3,144,049 | A | * | 8/1964 | Irwin Ginsburgh ............ 138/97 |
| 4,016,748 | A | * | 4/1977 | Boyens ..................... 73/40.5 R |
| 4,894,539 | A | * | 1/1990 | Hurst ............................. 250/303 |
| 6,931,952 | B2 | * | 8/2005 | Rantala et al. .............. 73/866.5 |
| 2003/0160391 | A1 | * | 8/2003 | McEwan ...................... 277/314 |
| 2005/0284530 | A1 | * | 12/2005 | McEwan et al. ............... 138/97 |

* cited by examiner

*Primary Examiner* — Patrick F Brinson
(74) *Attorney, Agent, or Firm* — Joseph T Regard, Ltd plc

(57) ABSTRACT

The present invention relates to a method of assessing the condition of a duct along which a gas is flowing. The method comprises producing one or more sensor carrying elements, wherein the elements are formed to have selected parameters; introducing the sensor carrying elements into the flowing gas; and selecting the parameters of the sensor carrying elements such that the elements are transported along the duct by saltation. The present invention also relates to a method of reducing leakage through a leak in the duct. In this respect, the method comprises producing sealing elements, wherein the sealing elements are formed to have selected parameters; introducing a plurality of the sealing elements into the flowing gas; and selecting the parameters of the sealing elements such that the elements are transported along the duct by saltation and such that, at the locality of the leak, at least one of said sealing elements is captured by a pressure differential associated with the leak and is thereby drawn to and held in position at the leak for stemming or sealing it.

16 Claims, No Drawings

DUCT ASSESSMENT AND LEAK SEALING METHOD FOR DUCTS TRANSPORTING GAS

The present invention relates to a method of assessing the condition of a duct along which a gas is flowing and a method of reducing leakage through a leak in a duct along which a gas is flowing.

Ducts or pipes are used extensively in industry to carry liquids and gases, often under high pressure. Once a duct or pipe has been installed, small fractures and/or holes can appear over time in the duct or pipe wall or at the joints between connecting sections of ducts. These are the result of various factors including corrosion, poor installation, manufacturing defects or mechanical damage; thus, leakage occurs.

However, it is usually the case, for one reason or another, that significant areas of the liquid or gas carrying ducts, once installed as part of a pipework system, become substantially inaccessible. For example, mains water distribution systems employ vast lengths of buried pipework which involves expensive and time consuming excavation to expose areas of pipe from which leakage is suspected.

The present Applicants have developed a number of techniques for locating, sealing and stemming leaks from liquid carrying ducts, examples of the techniques are disclosed in WO-A-01/086191 and WO-A-03/093713. The techniques uses sealing elements having a buoyancy similar to the liquid in the duct, i.e a neutral buoyancy. A plurality of the sealing elements are introduced into the duct and float along with the liquid. Due to the turbulence in the liquid, the sealing elements always encounter a leak no matter its location around the cross section of the duct and can therefore be captured by a pressure differential associated with the leak. Depending on the particular technique, the element can assist in locating the leak or can assist in stemming or sealing it. In an alternative, the elements can carry sensors so that the condition of the duct can be assessed by remote monitoring or recording.

The above described techniques are very effective in the case of a duct carrying liquid.

However, when these techniques are applied to the case of a duct carrying gas, it has been found that close matching of the buoyancy of the element to the gas density is very difficult. Moreover, even if such matching can be achieved, it has been found that elements of such low density do not have sufficient strength to maintain their form at the leak for location or sealing purposes. In addition, it has been found that such elements do not encounter leaks around the entire cross section of the duct and that the movement of the elements tend to be dominated by the drag forces exerted by the gas such that the element are not necessarily drawn to the leak at all, particular for leaks located towards and upper part of the duct.

It is an object of the present invention to provide a technique of assessing the condition of gas transporting ducts and of locating, sealing or stemming leaks from gas transporting ducts.

According to a first aspect of the present invention there is provided a method of assessing the condition of a duct along which a gas is flowing, the method comprising:

producing one or more sensor carrying elements, wherein the elements are formed to have selected parameters;

introducing one or more of said sensor carrying elements into the gas flowing along the duct;

and selecting said parameters of the sensor carrying elements such that the elements are transported along the duct by saltation.

According to a second aspect of the present invention there is provided a method of reducing leakage through a leak in a duct along which a gas is flowing, the method comprising:

producing sealing elements, wherein the sealing elements are formed to have selected parameters;

introducing a plurality of said sealing elements into the gas flowing along the duct;

selecting said parameters of the sensor carrying elements such that the elements are transported along the duct by saltation and such that, at the locality of the leak, at least one of said sealing elements is captured by a pressure differential associated with the leak and is thereby drawn to and held in position at the leak for stemming or sealing it.

By selecting the parameters of the elements such that the elements are transported along the duct, it is possible to ensure that in a gas transporting duct, a complete sweep of the entire volume of the gas filled duct can be made, and hence a complete sweep of the duct wall can be made. Accordingly, full analysis of the duct and/or sealing of leaks in the entire duct wall may be greatly facilitated for any orientation of the duct. Thus, having the elements transported along the duct by saltation, there is a bouncing ricocheting motion in which the transport of the elements is dominated by the frequent collisions with the wall of the duct.

By selecting the parameters of the elements appropriately, it is possible to optimise the transport mechanism of saltation to make the aforementioned complete sweep, and it is possible to optimise the energy transfer from the gas flow to the elements so that the number of elements required to have a sweep of the entire duct volume is minimized.

The present invention will now be described by way of example only. The present invention intends to provide a technique of assessing the condition of a duct along which a gas is flowing for transport from one location to another and of locating, sealing or stemming leaks from such a duct.

As noted above, known elements introduced into a gas carrying duct, which had a density similar to the density of the gas, did not have sufficient strength to maintain their form at the leak for location or sealing purposes. Whilst stronger and hence heavier elements overcame this problem, another problem resulted in that such heavier elements could not be transported along the duct with the gas flow and could not be transported along the duct in a manner to ensure a complete sweep of the entire cross section of the duct, that is to say, all portions of the duct wall, top bottom and the sides (for a circular cross section duct). Hereinafter, the bottom of the duct will be referred to as the 6 o'clock position and the top of the duct will be referred to as the 12 o'clock position.

It has been found that by forming the elements with particular selected parameters, it is possible to provide elements which are transported along the duct with the gas flow by saltation. Full saltation is considered to be the situation where the element rebounds from the duct wall at the 12 o'clock position as well as elsewhere. Of course the number of rebounds of an element near the 12 o'clock position will be significantly less that the number of rebounds near the 6 o'clock position. Effective saltation is considered to be when elements rebound near the 6 o'clock position substantially not more than 10 times as they rebound near the 12 o'clock position.

Saltation is a type of particle transport in which loose material in a fluid flow is removed from a surface, carried along by the fluid flow, before being returned to the surface, from which it may rebound or ricochet so the motion is repeated. Amongst examples of saltation are pebble transport in rivers, and sand grains blowing over dunes.

Looking at pebble transport, at low flow velocities, the pebble rolls downstream whilst at high flow velocities, the lift and moment exerted by the fluid flow on the material is enough to pull the pebble away from the river bed and into the river flow. As the pebble moves into the faster flow of the river away from the bed, the velocity difference between the pebble and the river flow decreases and so lift decreases. When the pebble weight is greater than the lift force, the pebble sinks back towards the surface. The pebble continues its transport path having frequent collisions with the bed thereby producing a discontinuous ricocheting progression along the river. Thus, a parabolic trajectory flight in the fluid between rebounds characterises transport by saltation with little deviation due to turbulence.

When being transported by saltation, the elements are driven along the duct in the flow direction, i.e. the longitudinal or downstream direction of the gas flow. The drag forces acting on the elements by the gas result in the elements gaining kinetic energy in the longitudinal direction. Part of this velocity is converted to a velocity in the transverse or crosstream direction of the gas flow when the elements collide or impact with the duct wall.

For effective assessment of the condition of the duct and/or for location or reduction of leakage from the duct, it is important that the elements can encounter at least a large proportion of the entire cross section of the duct carrying gas, that is to say, the elements should be making a complete sweep of the entire volume of the duct such that every part of the duct volume has a sufficiency of elements passing through it. In terms of sealing, there needs to be a sufficient intensity (per meter squared) of all collisions to ensure that a leak, should it exist, at any position of the duct will be sealed. Thus, if the transport of the elements by saltation is to be effective, the elements need to be able to rebound from the 6 o'clock position of the duct wall sufficient strongly to reach towards the 12 o'clock position of the duct wall and to rebound in a reasonably random manner. The critical volume to reach is towards the 12 o'clock position where the effects of gravity are most detrimental to making a complete sweep.

It has been found with the present invention that for effective saltation a number of distinct parameters affect whether a substantially complete sweep can be made. In particular, the elements need to have particular selected parameters.

As a crude model, one limit that can be considered for saltation is a lower limit of the element velocity after rebound using conservation of energy. In the case where the velocity of the element is purely in the transverse (or vertical) direction and all of the kinetic energy is converted into potential energy then the maximum height that the element will reach is governed by:

$$\tfrac{1}{2}mv^2=mgh \qquad 1$$

where:

m=mass of the element v=transverse velocity of the element at rebound g=acceleration due to gravity;

h=maximum height reached by the element.

If h set to be equal to the diameter d of the duct, then substituting d into equation 1 leads to:

$$V_{min}=4.43\sqrt{d} \qquad 2$$

where:

$V_{min}$=minimum vertical velocity to achieve a complete sweep using saltation.

Therefore, if a complete sweep using elements being transported by saltation is to be achieved in a larger duct, a greater value of $V_{min}$ is required.

However, the above equations assume that the element has all of its kinetic energy directed vertically. In practice this is unlikely to be the case. The element gains its kinetic energy from the flow of gas along the duct. Whilst there is some turbulent flow in the duct, the flow is dominated by the longitudinal flow in the direction of the duct. Thus, the driving force acting on the element is also dominant in this direction. The event which converts this longitudinal motion into transverse motion is the collision between the element and the duct wall.

To convert longitudinal velocity to transverse velocity, the element needs to be liable to random direction changes during the rebound and must also conserve energy such that longitudinal velocity is converted to transverse velocity.

One way to achieve this is to make sure the elements bounce of the walls such they there is not too great a disparity in the velocity before and after impact with the wall. By selecting the material of the elements carefully to have a high coefficient of restitution, the disparity can be minimised thereby aiding saltation. The coefficient of restitution can be expressed for an oblique collision as $$e=V_f\sin\theta_f/V_i\sin\theta_i \qquad 2$$

where: $V_f \sin\theta_f$ is the component of the rebound velocity normal to the collision $V_i \sin\theta_i$ is the component of the incident velocity normal to the collision.

Materials with high coefficients of restitution such as butadiene rubber are effective in maintaining the velocity of the element during saltation. Butadiene also has a high coefficient of friction, which encourages spin thus increasing the random direction of the rebound. Angular elements such as cubes are also preferred as they rebound in an irregular fashion.

It has been found that the rebound events from cubes of natural rubber cross-linked with butadiene rubber routinely result in >90% rebound/incident velocity, with the deviations of these bounce events being up to 50 degrees better than a perfect reflection, the average deviation from the perfect reflection being 14 degrees.

If it is assumed that the maximum velocity of the element is equal to the gas velocity prior to impact and that the rebound is 90% of that velocity at 50 degrees to the horizontal, then the minimum gas velocity to achieve saltation is expressed by:

$$v_{gas}=V_{min}/0.9\times\sin 50^\circ \qquad 4$$

Thus, the minimum gas velocity to achieve saltation is $6.43\sqrt{d}$, although it should be recognized that this figure is approximate as it is the result of an empirical study on one particular type of element. Therefore, a minimum gas velocity greater than $6\sqrt{d}$ is considered sufficient.

In the example of a 150 mm diameter duct, the minimum gas velocity to achieve some degree of saltation is 2.5 meters per second. Good saltation, whereby the average element will reach the 12 o'clock position can be achieved at 8 meters per second.

There is no theoretical limit to the duct diameter to achieve saltation. However for larger duct diameters, the pressure and hence gas density will dominate the flight of the elements.

The above does not take drag into effect. Drag will act to decelerate the elements in the transverse direction. The drag acting on the element is proportional to the cross sectional area of the element (i.e. for a regular shaped element the drag is proportional to the square of the side length) whereas the weight is proportional to the volume of the element (i.e. for a regular shaped element the weight is proportional to the cube of the side length). Consequently, as size increases, drag is reduced and the effectiveness of the saltation will improve.

Nevertheless, a consequence of drag is that the value $V_{min}$ must also increase to maintain saltation, although as indicated above, as the weight of the element increases, the deceleration due to drag is reduced. Therefore, the higher the weight of the element relative to the fluid, the better the saltation.

The parameters that affect the effectiveness of saltation can be summarised as follows.

1) Gas Velocity: There is a lower limit of approximately $6\sqrt{d}$ for the gas flow velocity for the elements to be transported effectively by saltation. As the speed increases, dispersion of the elements improves to an optimum level. However, beyond this optimum speed, fluid forces begin to dominate the transport and behaviour of the elements.

In this connection, gas velocity and gas pressure are linked. It was found that as the gas velocity increases, the number of elements required to achieve entrainment at a leak also increases. This is due to the kinetic energy required to be removed from the elements to stop their progress along the duct and achieve entrainment. Varying the gas pressure has the opposite effect on the number of elements required for entrainment which drops as the pressure increases. This is due to the pressure field in the duct being greater for higher pressures; hence the entrainment force is greater and the number of elements required for entrainment drops.

2) Relative Gas to Element Density: The gas density must be high enough to provide energy transfer to the element in the form of drag, but not so much that the element becomes suspended in the gas and can not drop out to enable saltation. It has been found that gas densities of greater than around 0.05% of the element density and up to around 50% of the element density are sufficient to drive the elements along. If a high gas density is used, the flow of the element is dominated by suspension so that as the elements travel along the duct, there are fewer vigorous wall collisions and the move in the lower portion of the pipe cross section, nearer the 6 o'clock position.

It should also be noted that as the gas pressure increases, the bounce height reduces due to the high pressure/high density gas slowing the fall of the element. Increasing the element size decreases the distance between bounces and increases the bounce height. As drag forces increase, the elements gain a greater longitudinal acceleration from the gas, but the transverse deceleration is also increased leading to a reduced bounce. This results in a flatter flight trajectory.

3) Element Size: The lower limit depends upon the density of the element and its ability to drop out of suspension. The upper limit depends upon the diameter of the duct and is of the order of d/4.

4) Pipeline Diameter: There is no theoretical limit to the duct diameter. In practice, the pressure and hence gas density will dominate the flight of the elements to a greater extent for larger duct diameters. There is an inherent link between the duct diameter and the gas velocity with respect to effective saltation.

5) Wall Roughness: Whilst saltation improves with increased wall roughness, the improvement is minimal unless the roughness is extreme such as pitting defects. It has been noted that conventional wall roughness ceases to influence saltation for particles greater than 700 micron in size.

6) Coefficient of Restitution: The nature of the rebound of the element is controlled by a number of factors:

the incident velocity
the incident angle
the orientation of an angular element with respect to the duct wall
the duct wall roughness
the rotational velocity of the element
the coefficient of restitution of the element
the coefficient of friction of the element.

The coefficient of restitution represents the ability of the element to rebound from a surface and elements formed from materials that exhibit a high coefficient of restitution will conserve more energy after a collision than a material with a low coefficient of restitution. Suitable materials include elastic materials such as rubber.

The coefficient of restitution can be evaluated by dropping the element vertically onto a surface from a known dropping height h and measuring the rebound height H of the rebound, the coefficient is represented by $$E=\sqrt{(h/H)}$$

Thus, an element with a perfect rebound would have a coefficient of restitution of 1.0.

It has been found that the coefficient of restitution is one of the parameters affecting whether effective saltation is obtained and generally, the coefficient of restitution should have a value in the range 0.5 to 1.0 and preferably in the range 0.75 to 1.0.

Elements formed with angular geometries, such as cubes, also improve the degree of direction change from a bounce after an element impacts with the duct wall. Elements formed with surfaces which provide a high coefficient of friction with the duct wall also improve spin and hence the degree of direction change from a bounce after an element impacts with the duct wall.

In the following examples, a number of elements were introduced into a duct having a leak. The size of the element was matched to the size of the leak to be sealed.

EXAMPLE 1

Elements were formed as a 5 mm cube of polybutadiene rubber vulcanized with sulphur. This material exhibits a high coefficient of restitution of 0.90. The elements were introduced into a duct of diameter 200 mm with a gas velocity of 8 m/s at a pressure of 1 bar and were found to travel down the duct in accordance with the saltation transport mechanism and were found to be drawn to the site of a leak in order that the leak could be sealed. Further experiments found that such elements can have a range of between 2 to 10 mm edge length and still be effective.

EXAMPLE 2

Elements were formed as a 2 mm cube of natural rubber. This material exhibits a relatively lower coefficient of restitution of 0.65. The elements were introduced into the a duct of diameter 22 mm with a gas velocity of 3 m/s at a pressure of 8 bar and were found to travel down the duct in accordance with the saltation transport mechanism and were found to be drawn to the site of a leak in order that the leak could be sealed.

EXAMPLE 3

The polybutadiene rubber vulcanized with sulphur used in Example 1 was found to have a tendency to be weak and could crumble when subjected to pressure. Whilst the natural rubber used in Example 2 was much stronger in comparison with polybutadiene rubber, it had a lower coefficient of restitution so elements made from this material were not so effectively transported by saltation. To overcome these limitations, elements made from polybutadiene rubber cross linked with natural rubber were formed as 1, 2, 3, 4, 6 and 10 mm cubes exhibiting a coefficient of restitution of 0.85. The elements were introduced into a duct of diameter 150 mm with a gas velocity of 14 m/s at a pressure of 60 bar. The results showed that such elements saltate effectively and were found to be drawn to and could seal leaks effectively.

Whilst it is necessary to produce elements which saltate effectively, other factors that affect the selection of an element used for sealing include the softness or compliance of the sealing element to form a good seal and the stiffness of the sealing element to maintain a seal at high pressures. An element, whether for sealing or otherwise, should be selected to be compatible with the gas being carried in the duct.

Although in the examples described herein, the sealing elements are formed as cubes, a variety of other geometries may be used including spheres, pyramids, octahedrons and tetrahedrons, (more aerodynamically shaped elements with higher drag coefficients such as thistle seed shaped elements, sheets or membranes are more suited to suspension and not saltation).

Whilst the above has been described primarily in relation to elements suitable for sealing or stemming leaks in a duct, it is apparent that the elements can carry sensors so that one or more elements flowing down a gas carrying duct can provide either stored or on line information about the condition of the duct walls.

In general it has been found that a minimum requirement to obtain saltation is if the various parameters are selected such that for each rebound at or near the 12 o'clock position of the duct, there are not more than 20 rebounds at or near a 6 o'clock position of the duct. However, good saltation can be achieved if the various parameters are selected such that for each rebound at or near the 12 o'clock position of the duct, there are not more than 10 rebounds at or near a 6 o'clock position of the duct.

It will be appreciated that the present invention has been described by way of example and is capable of considerable modification, the details of which will be readily apparent to a person skilled in the art.

The invention claimed is:

1. A method of assessing the condition of a duct along which a gas is flowing, the method comprising:
producing one or more sensor carrying elements, wherein the elements are formed of elastomeric material having selected parameters;
introducing one or more of said sensor carrying elements into the gas flowing along the duct; and
utilizing said parameters of said sensor carrying elements to facilitate said elements transport along the duct by saltation.

2. A method according to claim 1 wherein the parameters are selected such that during saltation the elements rebound at or near a 6 o'clock position of the duct not more than 20 times for each rebound at or near the 12 o'clock position of the duct.

3. A method according to claim 1 wherein the parameters are selected such that during saltation the elements rebound at or near a 6 o'clock position of the duct not more than 10 times for each rebound at or near the 12 o'clock position of the duct.

4. A method according to claim 1 further including the step of arranging the velocity of the gas flowing in the duct to be greater than 6d, where d is the diameter of the duct.

5. A method according to claim 1 wherein one of said parameters is the buoyancy of the elements and the elements are selected to be heavier than neutrally buoyant.

6. A method according to claim 3 wherein one of said parameters is the density of said elements, and wherein the density of the elements is selected to be in the range of 2 to 2000 times the density of the gas.

7. A method according to claim 1 wherein one of said parameters is the coefficient of restitution of the elements, and wherein the coefficient of restitution is selected to be in the range of 0.5 to 1.0.

8. A method according to claim 4 wherein the coefficient of restitution is selected to be in the range of 0.75 to 1.0.

9. A method according to claim 1 wherein the elements are formed of rubber.

10. A method according to claim 1 wherein the elements are formed of a polybutadiene rubber cross-linked with natural rubber.

11. A method according to claim 1 wherein one of said parameters is the shape of the elements, and wherein the shape of the elements is selected to be angular.

12. The method of claim 1, wherein the parameters are selected such that during saltation the elements rebound at or near a 12 o'clock position.

13. The method of claim 12, wherein the parameters are selected such that during saltation the elements rebound at or near a 6 o'clock position more than each rebound at or near the 12 o'clock position of the duct.

14. The method of claim 12, wherein the elements are formed of elastomeric material.

15. The method of claim 1, wherein the elements are selected to have a high coefficient of restitution.

16. The method of claim 15, wherein the elements further comprise one or more sensors.

* * * * *